(12) United States Patent
Callahan et al.

(10) Patent No.: US 7,401,954 B2
(45) Date of Patent: Jul. 22, 2008

(54) CONTROL PANEL ASSEMBLY WITH BULB VIBRATION DAMPENER

(75) Inventors: Kevin S. Callahan, La Minerve (CA); Laurent Lucaora, Vanves (FR)

(73) Assignee: Valeo Climate Control Corp., Auburn Hills, MI (US)

( * ) Notice: Subject to any disclaimer, the term of this patent is extended or adjusted under 35 U.S.C. 154(b) by 176 days.

(21) Appl. No.: 11/274,351

(22) Filed: Nov. 15, 2005

(65) Prior Publication Data

US 2007/0109800 A1  May 17, 2007

(51) Int. Cl.
*B60Q 3/00* (2006.01)

(52) U.S. Cl. .................. 362/489; 362/646; 362/655; 362/656; 248/27.1

(58) Field of Classification Search ............... 362/652, 362/655, 656, 133, 134, 555, 800, 488, 489, 362/646, 640; 248/27.1, 27.3; 340/815.42, 340/815.45, 815.5
See application file for complete search history.

(56) References Cited

U.S. PATENT DOCUMENTS

| | | | |
|---|---|---|---|
| 1,536,407 A * | 5/1925 | More ..................... 248/611 |
| 2,003,507 A * | 6/1935 | Guljas, Jr. ................. 200/51 R |
| 2,100,042 A * | 11/1937 | Travis ....................... 313/49 |
| 3,300,636 A * | 1/1967 | Quelland et al. ............. 362/372 |
| 3,639,751 A * | 2/1972 | Pichel ........................ 362/261 |
| 4,504,830 A * | 3/1985 | Boehme .................. 340/815.42 |
| 4,740,876 A * | 4/1988 | Roller ........................ 362/390 |
| 5,466,981 A * | 11/1995 | Fields et al. ................ 313/113 |
| 5,772,188 A | 6/1998 | Lund |
| 6,038,892 A * | 3/2000 | Schmitt ........................ 70/78 |
| 6,412,180 B1 | 7/2002 | Wolf et al. |
| 6,502,973 B1 * | 1/2003 | Lam .......................... 362/549 |
| 6,591,720 B1 | 7/2003 | Greenwald et al. |
| 6,745,740 B1 | 6/2004 | Decuir |

\* cited by examiner

*Primary Examiner*—Jacob Y Choi
(74) *Attorney, Agent, or Firm*—Dierker & Associates, P.C.

(57) ABSTRACT

Control panel architectures, and, specifically, architectures having bulb assemblies as features, particular those in control panels used in motor vehicle applications, are disclosed.

By providing restricting means such as for leg features as part of the control panel assay, bulb assemblies are more resistant to damage to the bulb globe or filaments, or other elements, due to the effect of undesired movement or vibration that occurs in motorized vehicles.

20 Claims, 6 Drawing Sheets

CONTROL PANEL ASSEMBLY WITH BULB VIBRATION DAMPENER

FIELD OF THE INVENTION

The present invention relates to control panel architectures, and, specifically, architectures having bulb assemblies as features, particular those in control panels used in motor vehicle applications.

BACKGROUND OF THE INVENTION

Devices for use in motorized vehicles, often have a means, such as control panels, to regulate various inputs and outputs from and to desired areas of the vehicle. In heating and air conditioning applications this involves the desired ability to ensure that the adequate temperature and amount of conditioned and non-conditioned air reaches the various areas of the vehicle by means of a adjustable control panel. For example, in automotive vehicles conditioned and non-conditioned air can be channeled through an HVAC unit and distributed to various areas, such as the foot or panel, defrost, demist, and other areas of the cockpit within the vehicle. To enable these applications there needs to be a controlling device, such as a control panel, within the cockpit to ensure that air is distributed properly, as desired, by the opening and closing of doors within the HVAC unit, allowing conditioned and/or non conditioned air to reach the appropriate areas requiring heating, air conditioning or fresh (non-conditioned or recirculated) air.

One of the problems that have existed in the art as it pertains to control panels is that there is a vibration or shock that that can occur and be transmitted to, or through, the control panel. In those cases, the bulbs and other parts of the panel can become off-balanced and, if not correctly designed, must be manually re-centered to be functional. There is therefore, a need to self-center or realign, various elements that become off centered, due to vibration or shock forces.

Examples of self-centering arrangements for parts can be found in various patents such as U.S. Pat. No. 6,745,740, Vibration Dampening Arrangement for IC Engines, issued Jun. 8, 2004, to Decuir, U.S. Pat. No. 6,591,720, Disk Brake Lathe Vibration Attenuator, issued Jul. 15, 2003, to Greenwald et al., U.S. Pat. No. 6,412,180, Anti-Vibration Element Having Separation Securement, issued Jul. 2, 2002, to Wolf et al., U.S. Pat. No. 5,772,188 Shock Absorber with Elastomeric Strip, issued Jun. 30, 1998, to Lund. Though these patents employ various methods of vibration dampening, they are not like those provided in aspects of the present invention.

Bulb assemblies in general and, in particular candlestick bulb assemblies, used in motor vehicle applications, especially control panel applications, must have a life that can stretch over an extended period of time while enduring not only vibration during testing, but vibration during operation and shock loads placed on the unit as it cycles between extreme temperatures. This results in a great deal of stress being placed on the bulb filaments in the globe and elsewhere, and a need to isolate vibration transmission to these areas is evident. Insufficient isolation results in an abnormally short life span of the bulb filament and globe.

SUMMARY OF THE INVENTION

In an aspect of the present invention, a control panel, and, in particular, a control panel assembly is found. The control panel assembly has at least one bulb, preferably at least two bulbs, more preferably two or more bulbs, and a board on which the bulb assembly or, preferably, the more than one bulb assembly, is attached to, or mounted in conjunction with, a board, and, particularly, a printed circuit board (PCB). The bulbs assemblies, in various aspects of the present invention, are of an incandescent type. For those assemblies incorporating a candlestick shape, the bulb assemblies can become cantilevered (fixed at one end such that no rotation occurs at the fixed end when the beam is loaded in bending. Cantilevered candlestick bulb assemblies, having at least one bulb filament in their interior leading to the globe of the assembly, can be supported by legs, arranged radially-symmetric around the lamp base. While the lamps maintain the same shapes, their resonance frequencies are increased by an important amount according to whether the radial springs (leg) are activated by the nodes radial displacements.

In general, there are large differences between the first resonance frequencies for the wires-bulb assembly of a bulb assembly and the other parts of, for examples, the candlestick assembly, for the candlestick alone, the wires-bulb assembly vibrates inside a rigid candlestick, thus witnessing damaging shocks when a low frequency excitation (<200 Hz) goes through the resonance frequencies. Aspects of the present invention utilizing elastic radial supports/legs, damage is greatly reduced due to the nature of the restricting means.

In regular use, a motorized vehicle with a control panel to communicate with the HVAC unit for controlling conditioned and/or non conditioned air to various areas of the vehicle, is subject to shock or vibration forces. In control panels such as those in aspects of the present invention, a control panel assembly, incorporating incandescent bulbs and in particular, candlestick bulb assemblies, have bulbs mounted to a board and, in particular, a printed circuit board (PCB). The PCB assembly employs one (1), two (2) or three (3) candlestick bulbs mounted to the board, as its light source. However, when subjected to actual shock, or vibration tests on the shaker, this can lead to the failure of some bulb assemblies mounted on the PCB (broken filament in bulb).

In aspects of the present invention, a vibration dampening feature is provided to isolate energy distribution evenly across a panel assembly. In particular, energy distribution is isolated or reduced in the area new or around the bulbs of the assembly, and, thereby, the risks of the bulb or bulb assemblies being disrupted, dislodged or otherwise damaged is diminished, as there is little to no direct impact, or destructive influence, on them by this vibration and/or excessive stress.

In particular aspects of the present invention, the bulb or bulb assemblies are maintained or 'restrained' by a restricting means. The restricting means preferably has projections or 'legs'. The bulb assembly, in the area of contact with the legs, is essentially circular in form, therefore having an approximate diameter that is measured essentially as one would a circle. For example a line in the approximate form of a circle can be drawn matching the outer dimensions of the circular diameter of the bulb assembly at the area of contact.

The restricting means can be made of a variety of materials such as metals or plastics. Preferably, the restricting means is made of a single material. Also, preferably, the material used is plastic or plastic like material. Single materials, for example, can be many types of plastic such as PC, ABS, ABS/PC or POM.

The materials of the present invention can be molded or otherwise formed into the restricting means either alone or as a part of, a single piece, either as a part of an assembly housing or another piece of a control panel. Preferably, the restricting means is molded, more preferably as a single piece, even more preferably as part of the control panel or assembly housing. For example, a control panel assembly that has a housing may have a restricting means that is molded or formed as a part of the housing of the control panel assembly.

In various aspects of the present invention used in control panel assemblies, the restricting means is formed or molded and has three or more legs, and the legs are arranged in a circumferential manner about the bulb assembly.

The materials of the present invention are of such properties that they have a 'spring' or 'flex' effect. The spring or flex effect ('flex effect'), as it relates to the bulb assemblies in aspects of the present invention, means that the restricting means, for example, molded legs, hold the bulb assembly with a certain amount pressure due to the elasticity of the materials such that it acts like a spring or other such device in the manner that it holds the bulb in place, without applying so much pressure that it damages or otherwise disrupts the functioning of the bulb assembly in the control panel. To achieve such a restriction, the restricting means as described hereinabove, is in its resting state, of a dimension smaller to that of the diameter of the bulb assembly at the point of contact in order to ensure a contact pressure. In other words, at the point of contact of the restricting means and the bulb assembly, the inner surface of the restrictions means is located with the inscribed circle determined by the diameter at that point of the bulb assembly. If the legs were to form a complete circle themselves, the diameter of such a circle would be less than the diameter of the bulb assembly inserted into or otherwise placed within, the restricting means at the point of insertion or placement.

In various aspects of the present invention, the restricting means are legs. In specific embodiments, the legs can be formed or molded as a part of the housing of the control panel, and, as such, be of the same material as the housing. The legs, thus molded, can therefore act like extensions from the housing that are aligned up with or follow the contours of, at least part of the bulb assembly. Where the restricting means is not directly molded as one piece the housing, such a means can be dipped or snapped or otherwise attached to the housing or other such support, as long as the align up or following the contour of at least part of the bulb assembly and provide the flex effect necessary to prevent or reduce damage to the bulb assembly.

Preferably, the bulb assembly is held in position by at least two legs, arranged radially-symmetrically. The legs can be of any dimension, as long as they relate to the bulb assembly in a manner to sufficiently support the lamps and dampens vibration. The shape of the legs can be of any shape that functionally supports and dampens vibration. Important is that at least one area of each leg contacts at least one area of each bulb assembly in the area of lamp assembly, below the actual globe. In various aspects of the present invention, each leg can contact two or more areas of the bulb support, particular the interior surface of the leg contacting the exterior surface of the bulb assembly below the globe itself, containing the illuminating filament. In other words, if a circle or circular type form is inscribed that is of the dimensions of the bulb assembly at the point or points of contact of the restrictions means and the bulb assembly, the inner most force or area of the restricted means would be found within the lines (interior to) the inscribed circle. The legs, therefore, support and act as a dampener for the bulb assemblies, particularly during periods of shock or vibration of the vehicle, particularly in the area of the control panel assembly.

In aspects of the present invention the two, or preferably more than two, legs, are located around the exterior of the bulb assembly. The legs are preferably arranged radially-symmetrically to each other around the periphery of the bulb assembly.

In examining the location of various features of aspects of the present invention, a control panel assembly has a restraining means, for example, legs, that follow around what can be described as a 'circle' (i.e. a continuous line drawn a around the points of the area of contact of the bulb assembly and legs, when assembled, would be, if inscribed at the area of contact of the legs around the bulb assembly such that the circle would have a diameter inferior to the diameter of the bulb assembly at the point of contact. In this manner, in various embodiments, the bulb assembly is retrained via a flex effect.

In other aspects of the present invention wherein legs are present, the legs have a flex effect such that when the bulb assembly is positioned within the space interior to the circumferentially arranged legs, a pressure is applied to hold the bulb assembly in place in spaces, without damaging or otherwise disrupting the functioning of the bulb assembly in the control panel assembly.

The present invention, in its various aspects, therefore, protects the bulb assembly, and, especially, the bulb filaments, from vibration or shock that could induce failure or rupture or other disruption, for example, by a vibration or movement of significance to the filament, to the extent it induces failure. The present invention particularly is useful in protecting bulb assemblies containing a bulb with one or more wires, or two or more wires or filaments, or within its assembly. Where the bulb assembly is such that it is rigidly fixed at its origin for example at its PCB, and free to move in space for other points, the assembly behaves like a cantilever beam, with a concentrated mass at its free or bulb globe end wires and/or filaments (collectively hereafter referred to as filaments herein).

DETAILED DESCRIPTION THE PRESENT INVENTION

Various aspects of the present invention, particularly for use in a motorized vehicle comprise a control panel assembly having a control panel; a restricting means; and a bulb assembly having at least two areas of contact with the restricting means. In preferred embodiments, the restricting means contacts the bulb assembly at the at least two areas of contact such that the bulb assembly is restrained so that disruption, dislodgment or other damage that affects bulb assembly performance, as the result of normal use, vibration or movement experienced by the motorized vehicle, is prevented.

Generally, the base of the bulb assembly is associated with a support, panel or the like (board), and, in particular, a board that serves more than one function, for example, a printed circuit board. The various aspects of the present invention have a protective or stabilizing effect as it concerns the functioning of the control panel assembly, and, in particular, the lighting elements of the control panel assembly. The aspects of the present invention allow for correct lighting, for example, while prevention disruption, dislodgment or other damage to the bulb assembly, and, in particular, disruption, dislodgment or damage such as filament damage.

In aspects of the present invention having a control panel assembly, the bulb assembly has a base end and a globe end. The light from the assembly is designed to be emitted from the globe end. The bulb assembly is preferably attached to or mounted in conjunction with the board at its base.

As described above, the board of the panel assembly may be a printed circuit board. In addition, the restricting means, in various aspects, comprises at least two legs, and each of the two legs has a distal and proximate end in relation to the board, or in particular, the printed circuit board. In various embodiments, the distal end of at least one of the two legs is close to or under the globe of the bulb assembly.

Bulb assemblies can be of numerous configurations, as long as they have a circumference such that the restricting means can contact the assembly in such as way to prevent damage to its elements during normal use, movement or vibration, particularly during motor vehicle use. Bulb assemblies that may particularly be used in various aspects of the present invention include candlestick bulb assemblies.

Figure 1:
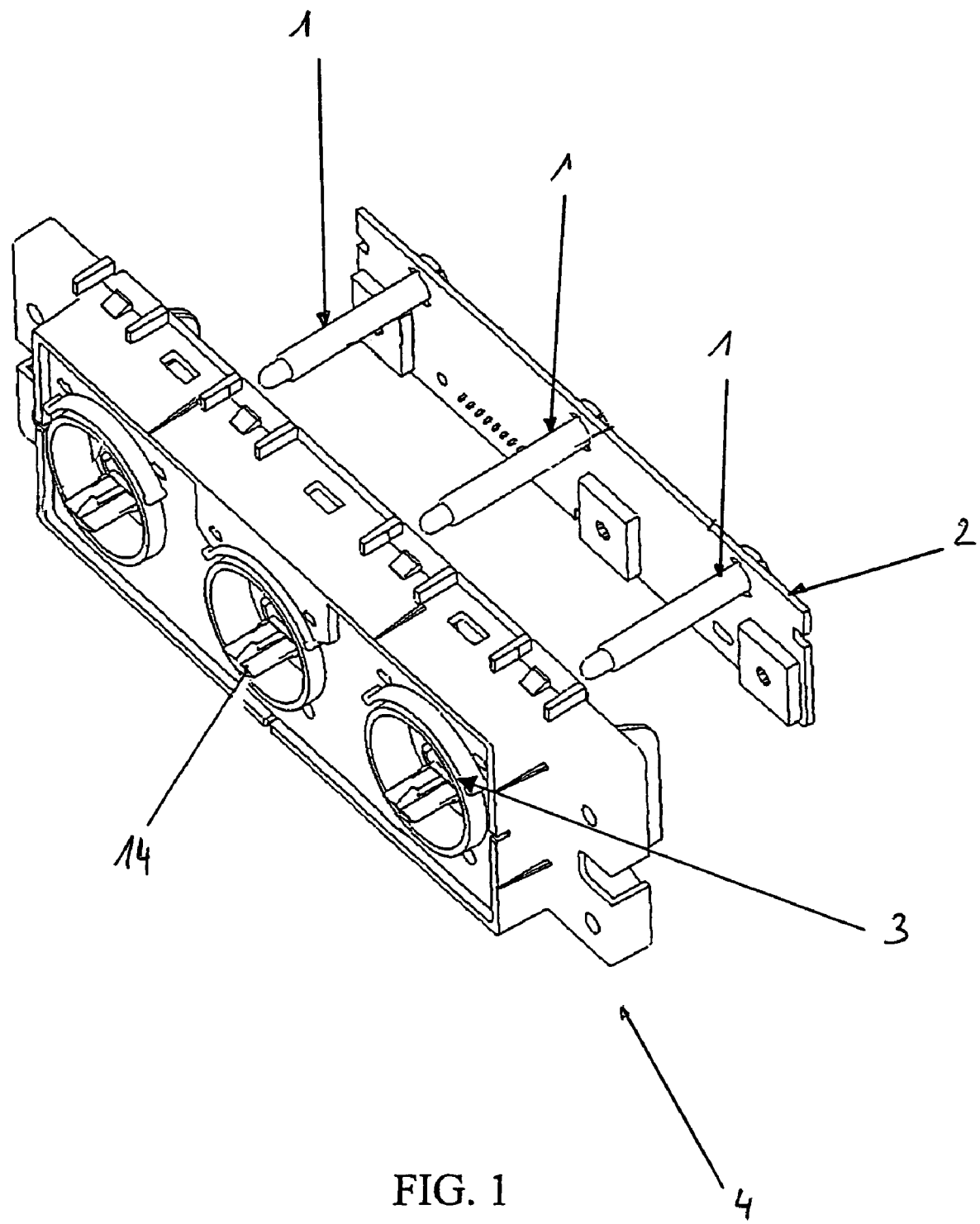
FIG. 1 is an exploded schematic view of a control panel assembly having a board, a control panel assembly with housing for restraining means and cap, in accordance with an aspect of the present invention.

Referring to FIG. 1, is illustrated a control panel assembly for an HVAC unit (not shown) having a control panel assembly (4), pc board (2) with bulb/lamp assemblies (1) attached to, or located on, the PCB and separated in relation to each other. The bulb assemblies are inserted through apertures of the control panel assembly intermediate housing or frame (3) of the control panel assembly, a bulb assembly (1) extending through an aperture (14) of the housing (3) and bulb assembly supports or legs (legs not shown in FIG. 1) that contact the bulb assembly at supporting shaft. A chrome ring is present, as is a rotary knob for selecting the function (e.g., fan speed, mode or temperature A rotary cap (not shown) attaches to the intermediate housing (3) on an armature feature (not shown) within the housing itself.

In various aspects of the present invention having legs, the legs are arranged around an axis which follows the axis of the bulb assembly when in its correct position. For example, restricting means are arranged around the axis and at the point of contact of the bulb assembly the means is then arranged around the assembly in a radial-symmetric manner. Where the restricting means consists of two or more legs, and, particularly three or more legs, the legs are preferably arranged radially-symmetrically.

In addition, legs of the present invention are preferred where the leg height and the leg's base is larger than its width at the base. Particularly wherein the legs are arranged radially-symmetrically, the legs have a height and width at the base of each leg such that the height at the base is greater than or equal to twice the width at the base.

Figure 2:
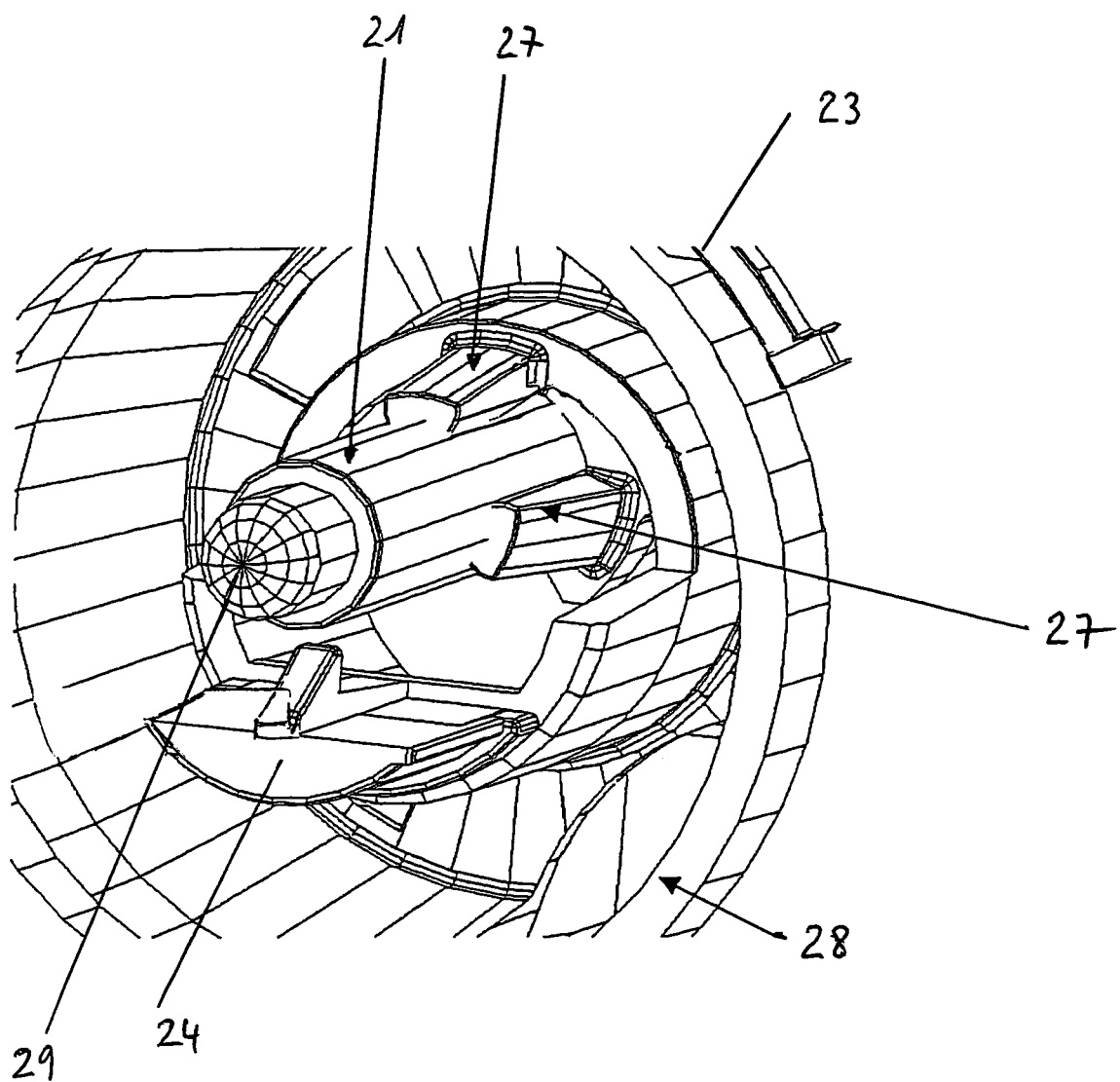
FIG. 2 is an exploded schematic view of the control panel assembly, having a bulb assembly and legs, in accordance with an aspect of the present invention.

Referring to FIG. 2, is shown a bulb assembly (21) with globe (29) which is maintained by spring or flex effect by restricting means (legs (27)). The legs (27) form an integral part (are a single piece) with the housing (23). Cap support (24) rotator knob location (28), occurs, is shown.

Legs useful in the present invention are, in various aspects, oriented around the bulb assembly such that there is an area of contact associated with each of the legs and the bulb assembly, and such that the areas of contact, if measured around the bulb assembly, are equidistantly separated from one another. Particular, when there are two or more legs, or even more particularly, where there are three or more legs, this relationship exists in preferred embodiments.

Figure 3:
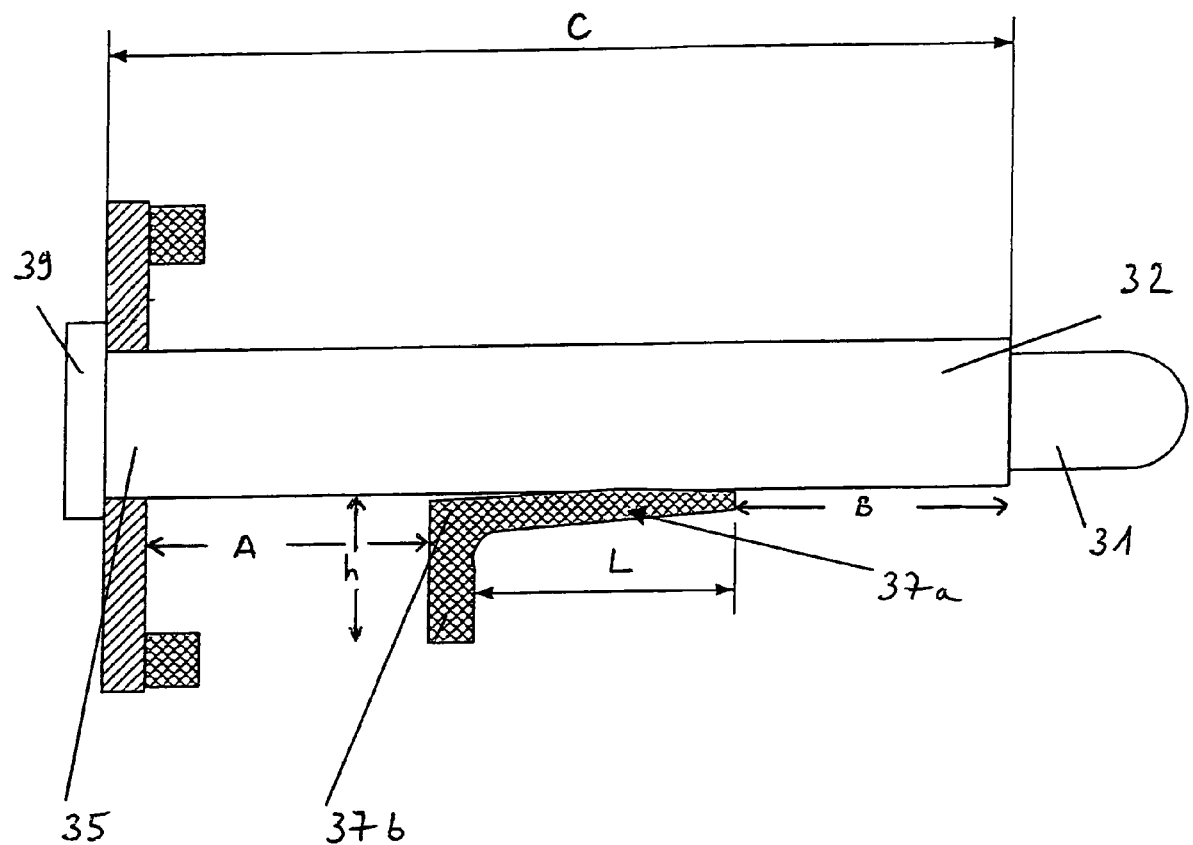
FIG. 3 is side schematic view of a bulb assembly, PCB and restricting means in accordance with an aspect of the present invention.

Referring to FIG. 3, a leg of FIG. 2 is shown in schematic section. The leg (37a, 37b) has a length dimension (L) from its base that supports the bulb along the exterior surface or shaft of the bulb assembly (32). The height (h) of the leg relates to the length (L) in such a fashion that the L is greater than its width at the base.

In FIG. 3 the distance A between the PCB and the proximate portion of the leg (37b) is, in various embodiments, less than the distance B between the distal end portion of the leg (37a) and the beginning of the globe (31). Base (35) on base end and globe (31) on globe end have distance (C) between them.

In various embodiments, and referring to FIG. 3, the tapered end (38a) of the leg is found on the end of the leg furthest from the base (39) of the bulb assembly (32) or closest to the globe (31) of the bulb assembly. The leg has a length (L) greater than or equal to 5.5 mm in motor vehicle control panel applications, preferably greater than or equal to 7.0 mm, most preferably between 5.5 mm and 10 mm. In general, length B is less than length L in preferred aspects of the present invention. The value of the sum of lengths L+B is greater than ½ of the value of length C, in preferred aspects of the present invention.

Figure 4:
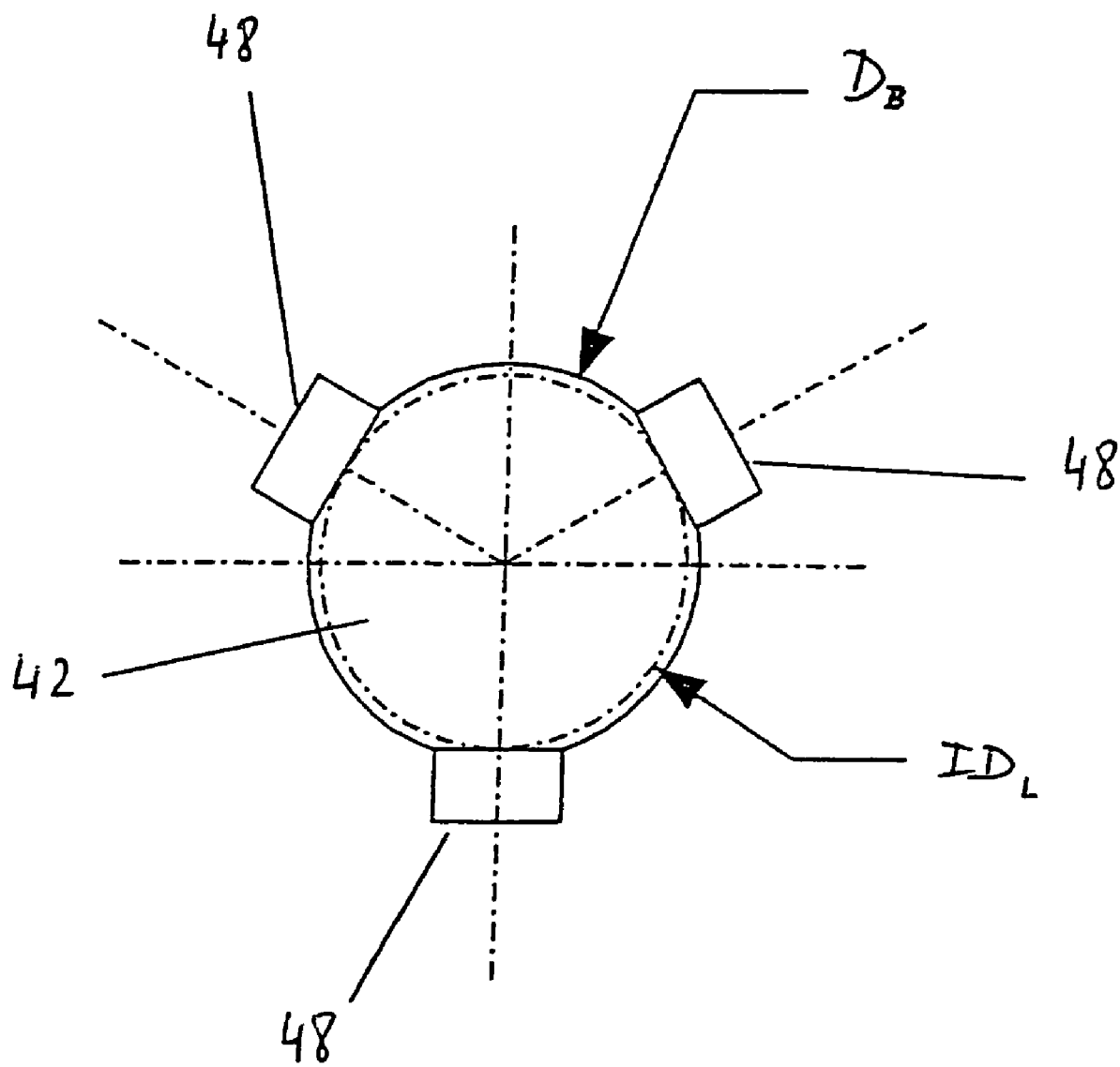
FIG. 4 is a cross sectional view of a leg and bulb assembly, indicating the relationship between the diameters of the legs and the bulb assembly, in accordance with an aspect of the present invention.

Referring to FIG. 4, the diameter M of the candlestick bulb assembly (42) is illustrated outside of dotted lines $IT_L$. The bulb assembly $D_B$ is herein represented as a so called 'candlestick' bulb assembly, due to its shape. The diameter M of the bulb assembly ($D_B$), especially, the candlestick bulb assembly in various embodiments, is such that its measured value is greater than that of the inner diameter of the legs ($ID_L$). In various embodiments of the present invention, the absolute value of the different between $D_B$ and $ID_L$, is most preferably around about 0.35 mm.

The spring or flex effect of legs (48) on the bulb assembly (42), allows for retention of bulb assembly (42) without damaging internal filaments, leading to disruption or malfunctioning of the bulb assembly when restrained.

In other aspects of the present invention, the combined length (L) of the leg is the length (B) between distal end of the leg and the globe of the bulb assembly, is greater than or equal to one half of the overall length of the bulb assembly from its base to its globe.

Figure 5:
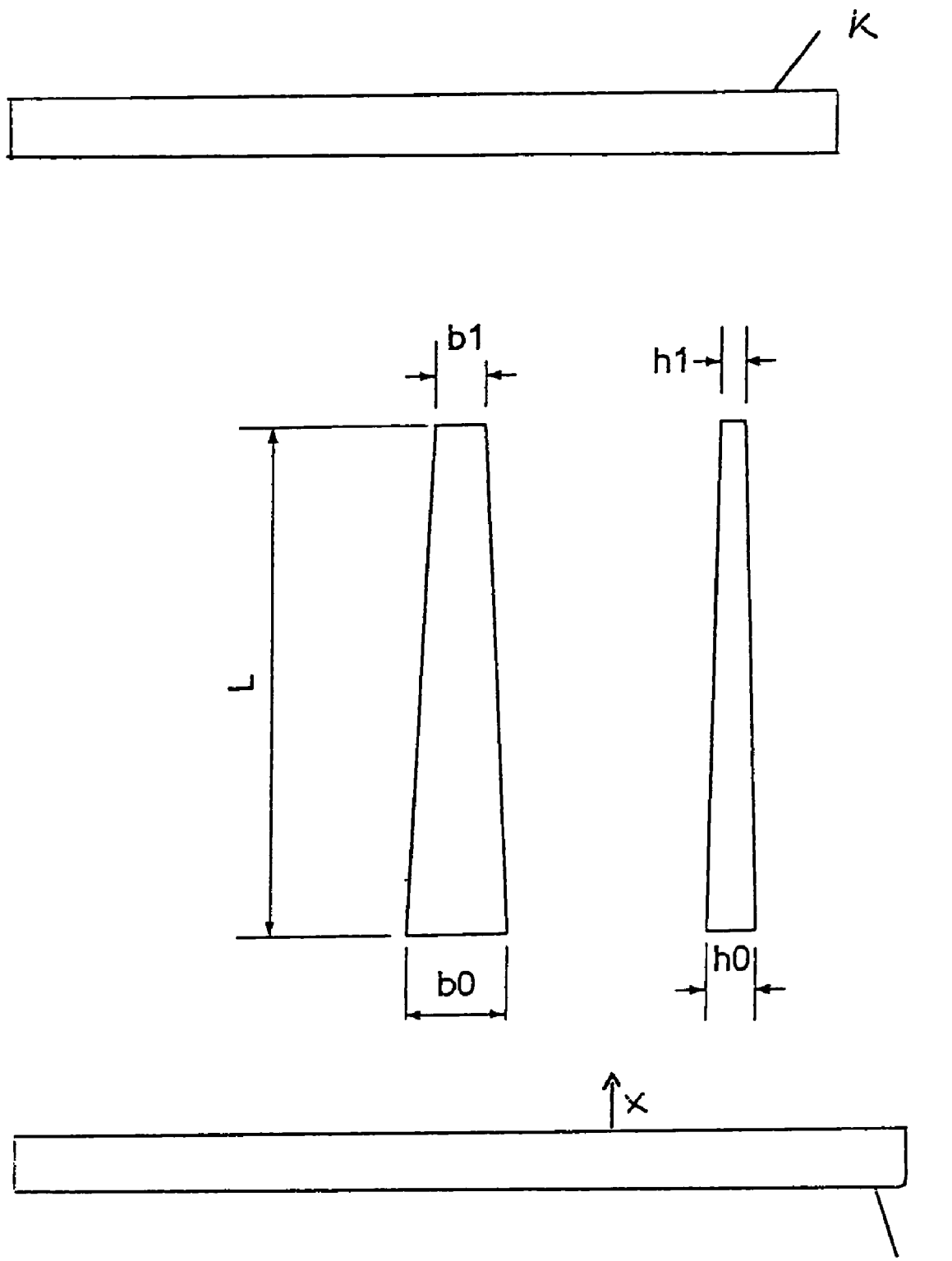
FIG. 5 shows a front and a side schematic view of a restricting means comprising a leg, in accordance with an aspect of the present invention.

Referring to FIG. 5, two legs are shown having a length L and a height b0 and h0 at the proximate end portion relative to the PCB board. The arrow X points in the direction extending from the PCB towards the cap K end of the bulb assembly. The legs are tapered from proximate end (nearest PCB) to distal (furthest from PCB) so that the heights at the end of the legs (b1, h1) are less than those at the other end (distal end) of the leg (b0, h0). The height to width ratio of the restricting means is approximate: height of restricting means is greater than or equal to 2 ×the width of the base of the restricting means. The base of the leg is, therefore, designed to spread the load of inertia through to the interfacing leg structure.

The base of each leg has a portion that is attached to the housing in a manner that it forms part of the housing, particularly at its proximate or base end. The legs, in preferred embodiments, further has distal end that is free, or that is closer to, and just under, the globe (31) of the bulb assembly.

Figure 6A:
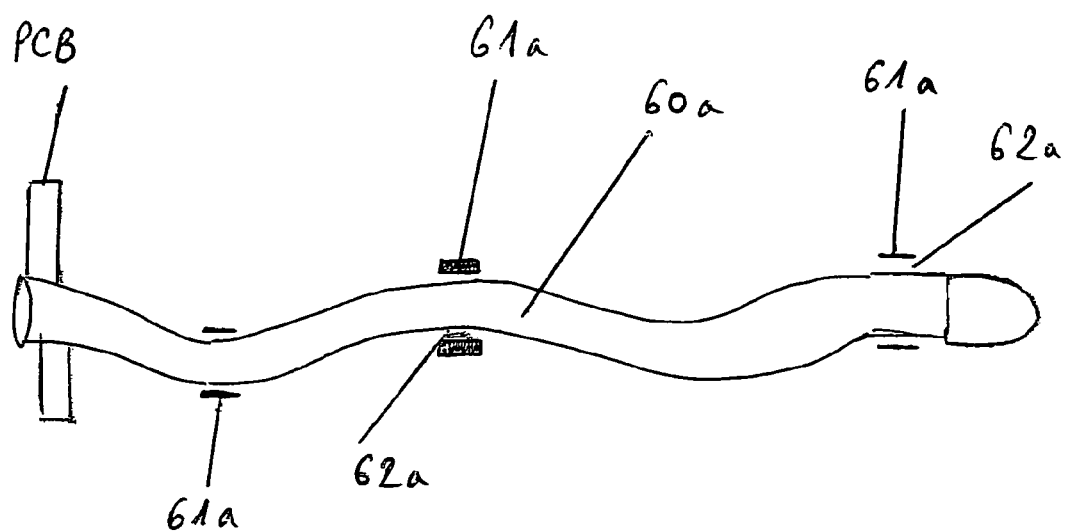
FIGS. 6a and 6b are schematic representation of bulb assemblies with contact areas for legs, in accordance with an aspect of the present invention.
Figure 6B:
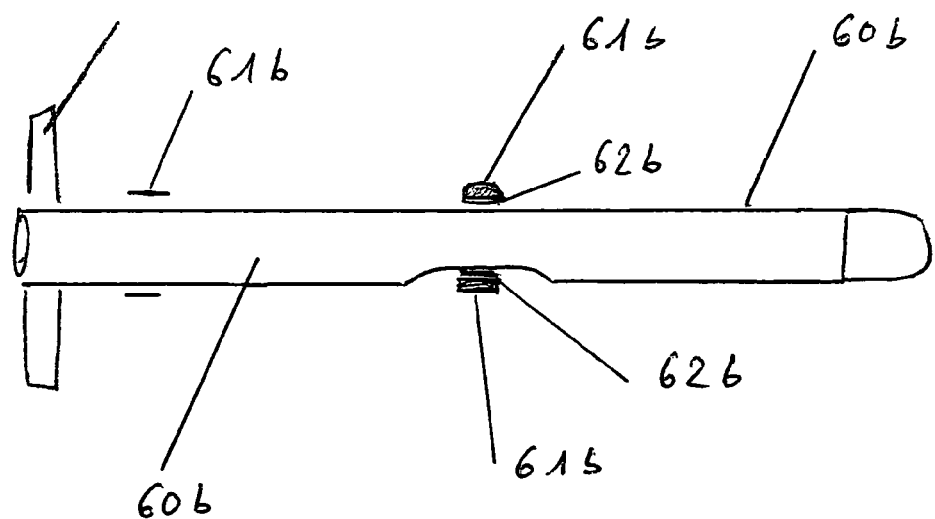

Referring to FIG. 6a and 6b are bulb assemblies (60a, 60b) with legs (61a, 61b) at various contact areas (62a, 62b) of the assemblies (60a, 60b).

By providing for such legs, the rotation and/or other movement of the bulb assembly is limited to variation in positions. By providing for legs, of a certain length and with a certain diametric distance absolute value between the bulb assembly and the legs, the bulb assembly is much less likely to suffer from movement damages, such as vibrational damage, that might ordinarily occur in assemblies used in motor vehicle, and, especially, control panel, applications. In an aspect of the present invention, having control panels and back boards, such as PCBs, wherein the base of the bulb assembly is associated or fixed in some manner fixed on PCB at its origin, and transversely restrained by elastic or elastomeric type legs have a spring or 'flex effect' slightly above mid-length, extra constraint is achieved by using three radially oriented 'spring-like' legs with high stiffness (to model the three legs coming out of the housing) and the candlestick behaves like a cantilever column elastically supported at an intermediate location.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such a feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A control panel assembly for a motorized vehicle, comprising: a control panel; a molded restricting means; an incandescent bulb assembly having a base end, a globe end configured to emit light, and an intermediate portion in between; and a board; wherein the incandescent bulb assembly is attached to or mounted in conjunction with the board at the base end; wherein the molded restricting means contacts the incandescent bulb assembly on at least two areas of contact on at least one location of the intermediate portion of the incandescent bulb assembly; wherein the globe end of the incandescent bulb assembly is not attached or restrained by the control panel, the board or the molded restricting means; and wherein the incandescent bulb assembly is restrained so that disruption, dislodgment or other damage that affects incandescent bulb assembly performance is prevented.

2. A control panel assembly as in claim 1, wherein filament damage is the disruption, dislodgment or other damage prevented to the incandescent bulb assembly by being mounted at the base end with the board, being restrained with the restricting means at the intermediate portion and by not being attached or restrained at the globe end.

3. A control panel assembly as in claim 1, wherein the board is a printed circuit board, the restricting means comprises at least two legs, and each of the two legs has a distal and proximate end in relation to the printed circuit board.

4. A control panel assembly as in claim 3, wherein the distal end of at least one of the two legs is close to or under the globe of the incandescent bulb assembly.

5. A control panel assembly as in claim 4, wherein the incandescent bulb assemblies are candlestick-shaped.

6. A control panel assembly as in claim 4, wherein the legs are arranged radially-symmetrically and have a height and width at the base of each leg such that the height at the base is greater than or equal to twice the width at the base.

7. A control panel assembly as in claim 3, wherein the legs are arranged radially symmetrically.

8. A control panel assembly as in claim 7, wherein the combined length (L) of the leg is the length (B) between distal end of the leg and the globe of the incandescent bulb assembly, is greater than or equal to one half of overall length of the incandescent bulb assembly from the base end to the globe end.

9. A control panel assembly as in claim 3, wherein the legs are oriented around the intermediate portion of the incandescent bulb assembly such that there is an area of contact associated with each of the legs and the incandescent bulb assembly, and such that the areas of contact, as measured around the incandescent bulb assembly, are equidistantly separated from one another.

10. A control panel assembly as in claim 9, wherein the restricting means has three or more legs.

11. A control panel assembly as in claim 9, wherein the restricting means is made of a single plastic or elastomeric material.

12. A control panel assembly as in claim 11, wherein the restricting means is formed or molded and has three or more legs, and wherein the legs are arranged in a circumferential manner about the intermediate portion of the incandescent bulb assembly.

13. A control panel assembly as in claim 12, wherein the restricting means is molded or formed as a single piece.

14. A control panel assembly as in claim 12, wherein the control panel assembly has a housing and wherein restricting means is molded or formed as a part of the housing of the control panel assay.

15. A control panel assembly as in claim 12, wherein the area of contact of the legs around the bulb assembly circumscribes a diameter less than the diameter of the incandescent bulb assembly at the point of contact.

16. A control panel assembly as in claim 12, wherein the intermediate portion of the incandescent bulb assembly is restrained via a flex effect.

17. A control panel assembly as in claim 12, wherein the legs have a flex effect such that when the intermediate portion of the incandescent bulb assembly is positioned within the space interior to the circumferentially arranged legs, a pressure is applied to hold the incandescent bulb assembly in place in space, without damaging or otherwise disrupting the functioning of the incandescent bulb assembly in the control panel assembly.

18. A control panel assembly as in claim 13, wherein the legs have a flex effect such that when the intermediate portion of the incandescent bulb assembly is positioned within the space interior to the circumferentially arranged legs, a pressure is applied to hold the incandescent bulb assembly in place in space, without damaging or otherwise disrupting the functioning of the bulb assembly in the control panel assembly.

19. A control panel assembly as in claim 14, wherein the legs have a flex effect such that when the intermediate portion of the incandescent bulb assembly is positioned within the space interior to the circumferentially arranged legs, a pressure is applied to hold the incandescent bulb assembly in place in space, without damaging or otherwise disrupting the functioning of the incandescent bulb assembly in the control panel assembly.

20. A control panel assembly as in claim 15, wherein the legs have a flex effect such that when the intermediate portion of the incandescent bulb assembly is positioned within the space interior to the circumferentially arranged legs, a pressure is applied to hold the incandescent bulb assembly in place in space, without damaging or otherwise disrupting the functioning of the incandescent bulb assembly in the control panel assembly.

* * * * *